US007778540B2

(12) United States Patent
Miyazaki et al.

(10) Patent No.: US 7,778,540 B2
(45) Date of Patent: Aug. 17, 2010

(54) VERIFICATION APPARATUS AND VERIFICATION METHOD FOR RECORDING MEDIA

(75) Inventors: Kenji Miyazaki, Komae (JP); Takeo Miki, Machida (JP); Junji Miura, Naka-gun (JP); Takahisa Nakano, Yokohama (JP); Takashi Yamaguchi, Kawasaki (JP); Shinya Tokuda, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 711 days.

(21) Appl. No.: 11/790,782

(22) Filed: Apr. 27, 2007

(65) Prior Publication Data
US 2007/0279515 A1 Dec. 6, 2007

(30) Foreign Application Priority Data

Apr. 28, 2006 (JP) ............... 2006-126371
Sep. 28, 2006 (JP) ............... 2006-265583

(51) Int. Cl.
*G03B 15/02* (2006.01)
*H04N 5/445* (2006.01)
*H04N 1/21* (2006.01)
*H04N 1/23* (2006.01)

(52) U.S. Cl. ............... 396/155; 348/564; 358/296; 358/302

(58) Field of Classification Search ............... 396/155
See application file for complete search history.

(56) References Cited

U.S. PATENT DOCUMENTS 5,751,371 A * 5/1998 Shintani ............... 348/564

5,841,549 A * 11/1998 Munakata ............... 358/296
5,946,101 A 8/1999 Kobayashi ............... 356/614
2005/0237616 A1 10/2005 Hillmann et al. ............ 359/566

FOREIGN PATENT DOCUMENTS

| FR | 2785697 | 5/2000 |
| JP | 01-096685 | 4/1989 |
| JP | 2002-221496 | 8/2002 |
| JP | 2003-254910 | 9/2003 |
| JP | 2004-150885 | 5/2004 |
| JP | 2005-267461 | 9/2005 |

OTHER PUBLICATIONS

Machine English translation of Ono, JP 2003-254910, Sep. 2003, 30 pages cited on applicant's IDS of Apr. 27, 2007.*
Korean Office Action dated Jun. 13, 2008 for Application No. 10-2007-40916.
European Search Reported dated May 19, 2009 for Application 07008674.9-2211/1852752.

* cited by examiner

*Primary Examiner*—Melissa J Koval
(74) *Attorney, Agent, or Firm*—Pillsbury Winthrop Shaw Pittman, LLP

(57) ABSTRACT

On a recording medium serving as a verification object, a picture whose state changes in accordance with optical conditions is formed. A verification apparatus images a plurality of pictures of the recording medium while changing an optical relationship among a light source for illuminating the recording medium, a camera for imaging a picture of the recording medium, and the recording medium with a condition modifying unit. The verification apparatus displays the plurality of pictures of the recording medium imaged by the camera, on the display unit in a state in which the optical relationship has been changed. The verification apparatus determines imaging conditions for imaging a picture for verification on the basis of the optical relationship at the time of photographing selected pictures among the plurality of pictures displayed on the display unit.

10 Claims, 10 Drawing Sheets

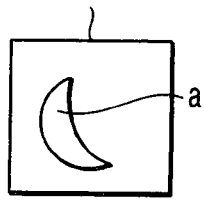 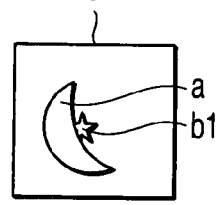 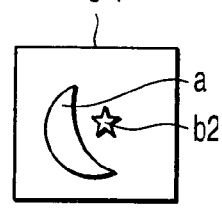
FIG. 4A  FIG. 4B  FIG. 4C
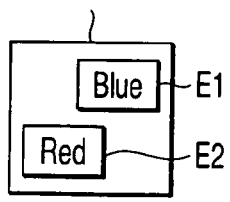 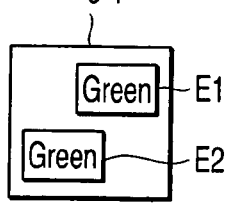 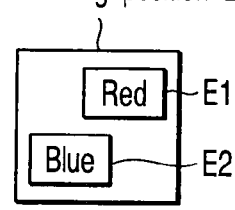
FIG. 5A  FIG. 5B  FIG. 5C

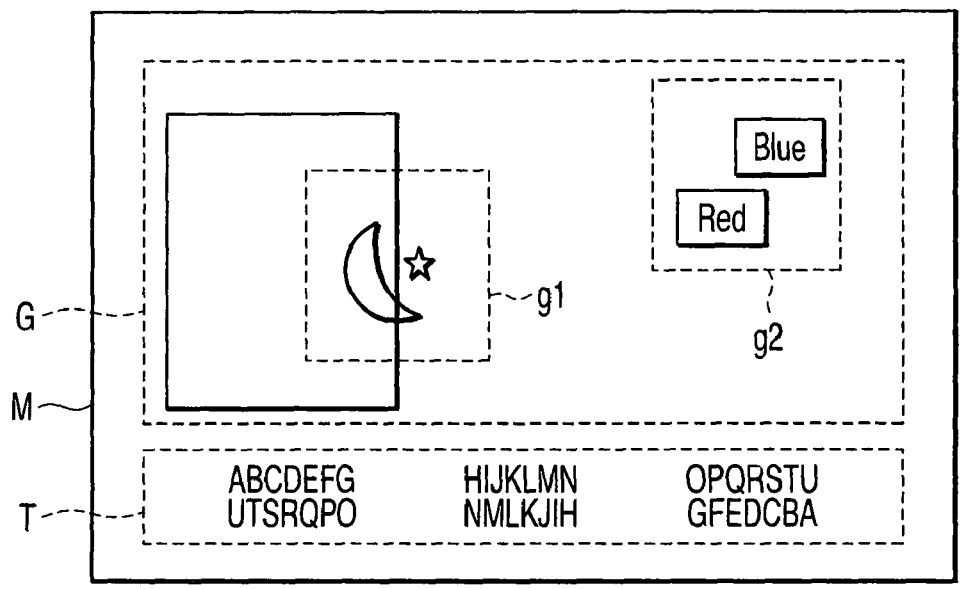
F I G. 11
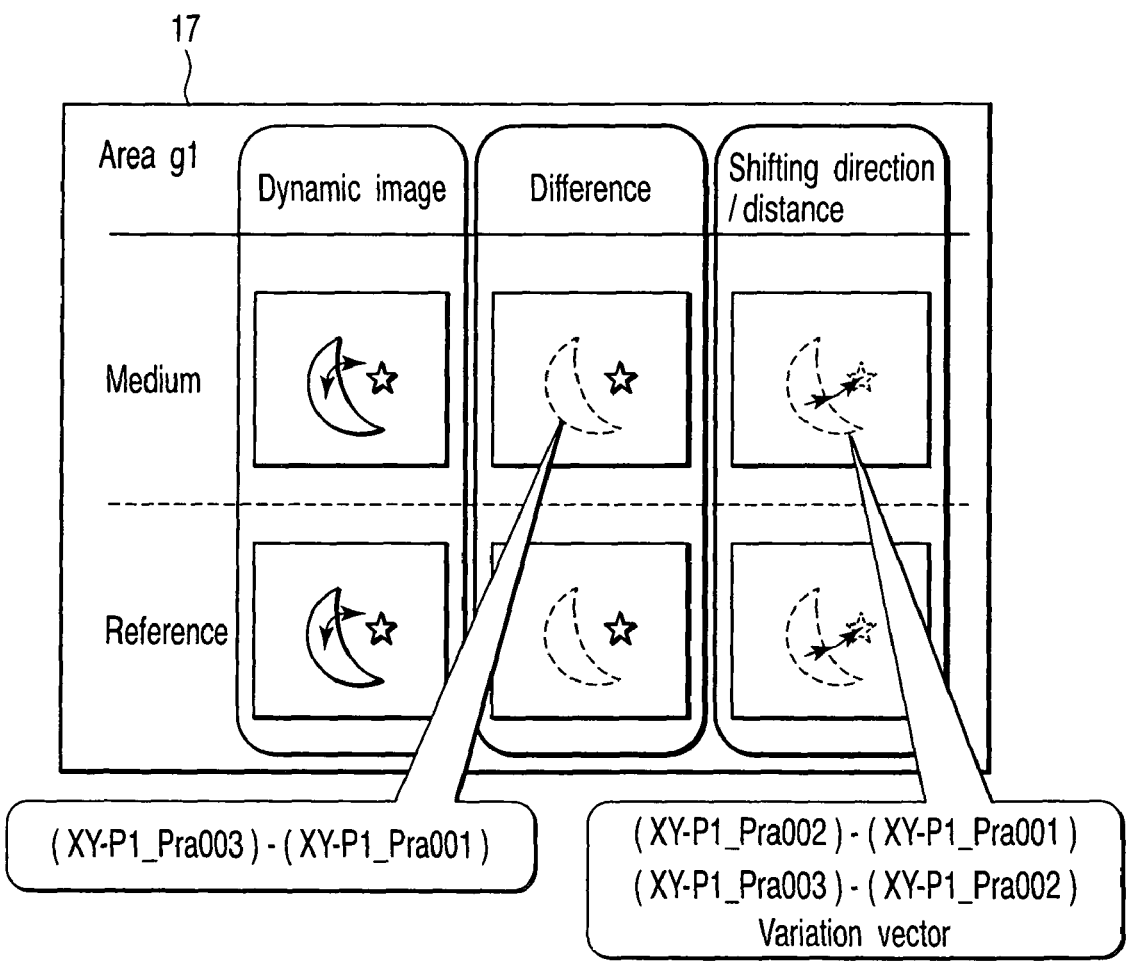
F I G. 12

VERIFICATION APPARATUS AND VERIFICATION METHOD FOR RECORDING MEDIA

CROSS-REFERENCE TO RELATED APPLICATIONS

This application is based upon and claims the benefit of priority from prior Japanese Patent Applications No. 2006-126371, filed Apr. 28, 2006; and No. 2006-265583, filed Sep. 28, 2006, the entire contents of both of which are incorporated herein by reference.

BACKGROUND OF THE INVENTION

1. Field of the Invention

The present invention relates to a verification apparatus and a verification method for verifying a recording medium on which a picture whose state changes under various conditions is formed, by use of an optical material such as, for example, a hologram and a diffraction grating.

2. Description of the Related Art

In recent years, as recording media (printed matters) requiring high reliability such as ID cards, certificates, or securities, recording media on which a picture is formed by use of an optical material such as, for example, a hologram and a diffraction grating in order to prevent forgery, have been increasing. With respect to a picture formed on such a recording medium as described above, a state thereof changes in accordance with an observational environment. Therefore, conventionally, it is checked with human eyes whether the quality of a picture on a recording medium as described above is appropriate.

Conventionally, as a verification apparatus for recording media as described above, in Japanese Patent No. 2728205 or Jpn. Pat. Appln. KOKAI Publication No. 2002-221496, there is disclosed an apparatus which acquires a picture of the recording medium at a specific position in a state in which light is irradiated on a recording medium from a specific direction, and which makes an operator check the acquired picture. However, by the technology disclosed in the Japanese Patent No. 2728205 or the Jpn. Pat. Appln. KOKAI Publication No. 2002-221496, it is difficult to check the quality while detecting a variation in a picture on a recording medium which changes under various conditions.

Further, in Jpn. Pat. Appln. KOKAI Publication No. 2003-254910, there is disclosed an apparatus which is capable of arbitrarily setting an illuminating direction with respect to a recording medium, a direction in which a picture from a recording medium is acquired, or the like. Further in Jpn. Pat. Appln. KOKAI Publication No. 2003-254910, a picture that a recording medium is photographed under specific conditions and a picture to be a reference are displayed. In accordance therewith, in Jpn. Pat. Appln. KOKAI Publication No. 2003-254910, an operator is made to check the picture of the recording medium. However, in Jpn. Pat. Appln. KOKAI Publication No. 2003-254910, a picture acquired from a recording medium under specific conditions and a reference picture are merely compared with one another with human eyes. Therefore, in the Jpn. Pat. Appln. KOKAI Publication No. 2003-254910, there are problems in time required for verification and verification accuracy.

BRIEF SUMMARY OF THE INVENTION

An object of an aspect of the present invention is to provide a verification apparatus and a verification method for recording media which are capable of efficiently verifying a recording medium having a picture which changes in accordance with optical conditions.

According to an aspect of the present invention, there is provided a verification apparatus which verifies a recording medium on which a picture whose state changes in accordance with optical conditions is formed, the apparatus comprising: an illumination unit which illuminates the recording medium; an imaging unit which images a picture of the recording medium illuminated by the illumination unit; a changing unit which changes an optical relationship among the illumination unit, the imaging unit, and the recording medium; a display unit which displays a plurality of pictures of the recording medium imaged by the imaging unit in a state in which the optical relationship has been changed by the changing unit; and a determination unit which determines imaging conditions for imaging a picture for verification on the basis of an optical relationship at the time of photographing selected pictures among said plurality of pictures displayed on the display unit.

According to an aspect of the present invention, there is provided a verification method for verifying a recording medium on which a picture whose state changes in accordance with optical conditions is formed, the method comprising: illuminating the recording medium by an illumination unit; imaging a picture of the recording medium illuminated by the illumination unit with an imaging unit; changing an optical relationship among the illumination unit, the imaging unit, and the recording medium; displaying a plurality of pictures of the recording medium imaged by the imaging unit on a display unit in a state in which the optical relationship has been changed; and determining imaging conditions for imaging a picture for verification on the basis of an optical relationship at the time of photographing selected pictures among said plurality of pictures displayed on the display unit.

According to an aspect of the present invention, there is provided a verification apparatus which verifies a recording medium on which a picture whose state changes in accordance with optical conditions is formed, the apparatus comprising: a storage unit in which imaging condition information and analysis information are stored as setting information for verification for each attribute of recording media; an imaging unit which images a picture of the recording medium serving as a verification object under imaging conditions based on the imaging condition information corresponding to an attribute of the recording medium serving as a verification object stored in the storage unit; an analyzing unit which carries out analysis process of the picture of the recording medium imaged by the imaging unit on the basis of the analysis information corresponding to the attribute of the recording medium serving as a verification object stored in the storage unit; and a display unit which displays an analysis result by the analyzing unit with respect to the picture of the recording medium serving as a verification object imaged by the imaging unit.

According to an aspect of the present invention, there is provided a verification method for verifying a recording medium on which a picture whose state changes in accordance with optical conditions is formed, the method comprising: reading imaging condition information corresponding to an attribute of a recording medium serving as a verification object; imaging a picture of the recording medium serving as a verification object under imaging conditions based on the read imaging condition information; reading analysis information corresponding to the attribute of the recording medium serving as a verification object; analyzing the picture of the recording medium imaged by the imaging unit on the basis of the read analysis information; and displaying a result of the analysis process with respect to the imaged picture of the recording medium serving as a verification object, on a display unit.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 4A is a diagram showing an example of an observed picture of the recording medium illuminated from a first illuminating position;

FIG. 4B is a diagram showing an example of an observed picture of the recording medium illuminated from a second illuminating position;

FIG. 4C is a diagram showing an example of an observed picture of the recording medium illuminated from a third illuminating position;

FIG. 5A is a diagram showing an example of an observed picture of the recording medium illuminated from the first illuminating position;

FIG. 5B is a diagram showing an example of an observed picture of the recording medium illuminated from the second illuminating position;

FIG. 5C is a diagram showing an example of an observed picture of the recording medium illuminated from the third illuminating position;

FIG. 11 is a diagram showing an example of a recording medium serving as a verification object;

FIG. 12 is a diagram showing a display example for verifying a picture in a first area in the recording medium;

DETAILED DESCRIPTION OF THE INVENTION

Hereinafter, an embodiment of the present invention will be described with reference to the drawings.

First, a verification apparatus according to the embodiment will be schematically described.

The verification apparatus according to the embodiment is to verify a recording medium (verifying medium) having a picture which changes under various conditions. A picture of a recording medium serving as a verification object of the above-described verification apparatus is formed, for example, by use of an optical material whose colors or the like change in accordance with optical conditions. The above-described verification apparatus determines conditions for detecting a desired picture from a recording medium, or judges the quality of the recording medium (the picture of the recording medium) on the basis of a picture detected (acquired) from the recording medium.

The above-described optical material has a reflection property depending on a characteristic of an incident light. For example, as the above-described optical material, a hologram, a diffraction grating, an OVD (Optical Variable Device), an OVI (Optical Variable Ink), or the like can be assumed. Note that a picture to be formed on a recording medium may be one whose state changes under various conditions by concavity and convexity caused by ink (embossment and watermark of ink according to a scanning structure), concavity and convexity caused by embossment, and the like.

As recording media on which a picture changing under various conditions is formed, for example, ID cards, credit cards, cash cards, key cards, various certificates, marketable securities, and the like can be assumed. Among recording media as described above, generally, a specific picture is formed by use of an optical material as described above for each type (certificate type) of the respective recording media. Therefore, as one aspect of the verification apparatus, it can be assumed that the verification apparatus is used as an apparatus which verifies the authenticity of the recording medium by judging whether or not a picture formed on the recording medium serving as a verification object is valid as a picture of the certificate type. Further, as another aspect of the verification apparatus, it can be assumed that the verification apparatus is used as an apparatus which verifies whether or not a picture of the recording medium formed by use of the above-described optical material is favorable as a desired picture in the production process of a recording medium.

Next, a structure of the verification apparatus according to the present embodiment will be described.

Figure 1:
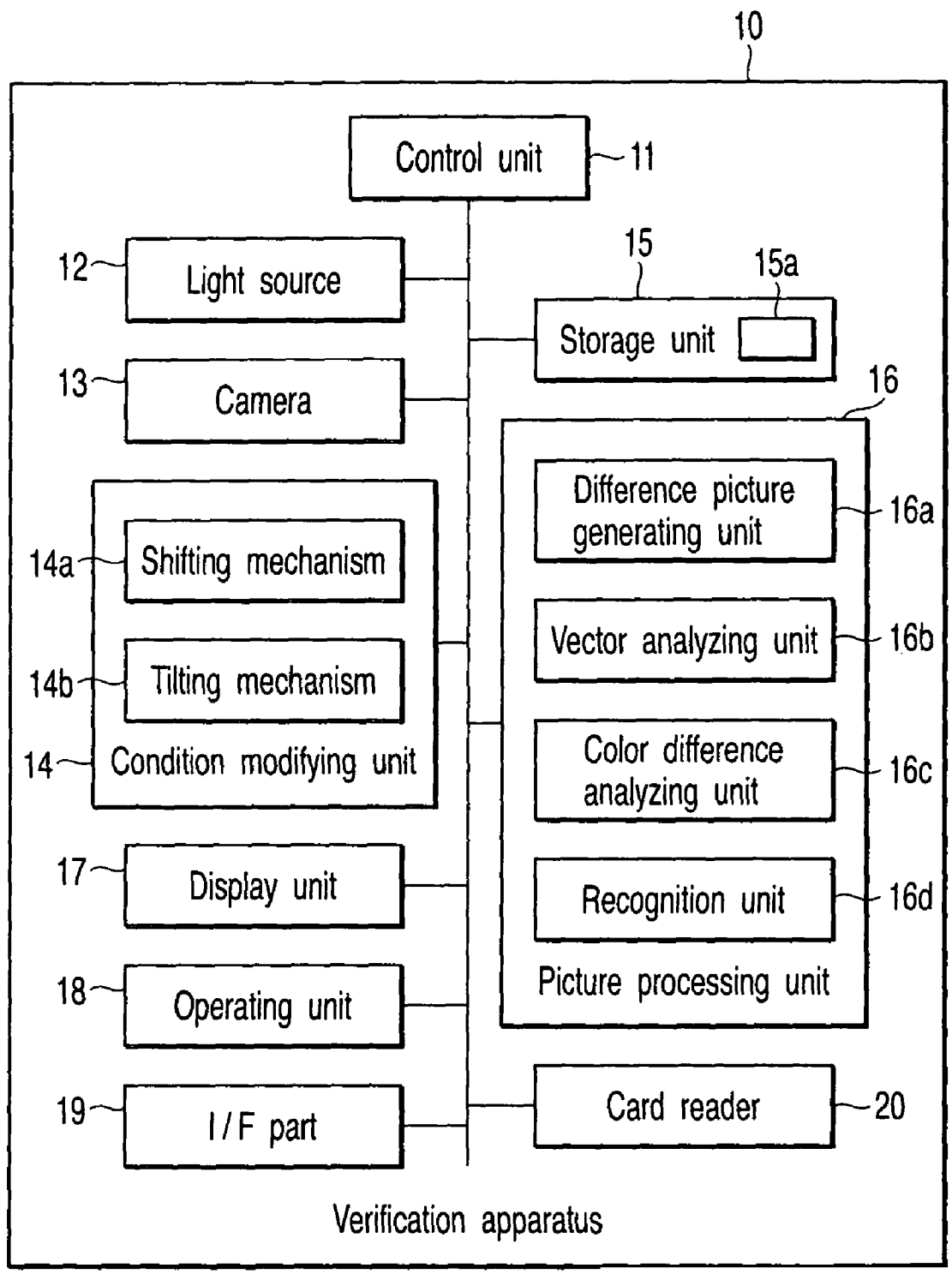
FIG. 1 is a block diagram showing a structural example of a verification apparatus.

FIG. 1 is a block diagram showing a structural example of a verification apparatus 10.

In the structural example shown in FIG. 1, the verification apparatus 10 has a control unit 11, a light source 12, a camera 13, a condition modifying unit (shifting mechanism 14a, tilting mechanism 14b) 14, a storage unit 15, a picture processing unit 16, a display unit 17, an operating unit 18, an interface unit (I/F) 19, and the like. Further, when the recording medium serving as a verification object is a medium having a storage unit which stores information, such as an IC card having an IC chip or a magnetic card having magnetic stripes, a card reader 20 for reading the information stored in the storage unit of a recording medium M is provided to the verification apparatus 10.

The control unit 11 manages overall control of the verification apparatus 10. The control unit 11 is structured from a CPU, a memory, various interfaces, and the like. The control unit 11 achieves various functions of controlling respective units, by executing a control program stored in the memory.

The light source 12 is illumination for irradiating light onto the recording medium (verification medium) M. Lighting of the light source 12 is controlled by the control unit 11. Further, as an illuminating radiation from the light source 12, it is possible to select a radiation with an arbitrary wavelength. For example, as an illuminating radiation from the light source 12, a specific monochromatic radiation with a relatively-narrow wavelength range may be used. In this case, a direction of a diffracted light serving as light obtained by reflecting an illuminating radiation from the light source 12 on the recording medium M can be specified within a relatively-narrow range. In accordance therewith, a range of angles from which the diffracted light enters the camera 13 can be made narrower. As a result, an S/N ratio can be made higher.

The camera 13 images a picture of the recording medium by receiving a reflected light from the recording medium M. The camera 13 images (acquires) a plurality of pictures of the recording medium M under various conditions. The camera 13 may image pictures (dynamic image) of the recording medium M sequentially at a predetermined frame rate, or may image a plurality of pictures of the recording medium M under the control of the control unit 11 in an arbitrary timing.

Further, in the verification apparatus 10, the camera 13 is structured from an area sensor imaging pictures of the recording medium M within a wide range. However, the camera 13 is not limited to the above-described structure. For example, the camera 13 may image pictures of the recording medium M by use of a line sensor in which a plurality of image pickup elements are arranged in line forms. In this case, the camera 13 images the pictures of the recording medium M by scanning the entire surface of the recording medium M while moving at least one of the line sensor and the recording medium M.

The condition modifying unit 14 is for changing an optical relationship (imaging conditions) such as relative positions, relative angles, and the like among the light source 12, the camera 13, and the recording medium M. The condition modifying unit 14 may change a position and a direction of the light source 12, may change a position and a direction of the camera 13, or may change a position and a direction of the recording medium M. Moreover, the condition modifying unit 14 may be provided respectively to the light source 12, the camera 13, and the recording medium M. Namely, any structure suffices provided that it is possible to modify an optical relationship (relative positional relationship or the like) among the light source 12, the camera 13, and the recording medium M.

When a position and a direction of the light source 12 are modified, the condition modifying unit 14 is structured from a mechanism of changing a position and a direction of the light source 12. In this case, the condition modifying unit 14 of the light source 12 is structured from, for example, the shifting mechanism 14a for shifting a position of the light source 12 and the tilting mechanism 14b for changing a direction of light irradiated from the light source 12.

Further, when a position and a direction of the camera 13 are changed, the condition modifying unit 14 is structured from a mechanism of changing a position and a direction of the camera 13. In this case, the condition modifying unit 14 of the camera 13 is structured from, for example, the shifting mechanism 14a for shifting a position of the camera 13 and the tilting mechanism 14b for changing a photographing direction of the camera 13.

Further, in the case of a structure in which a position and a direction of the recording medium M are changed, the condition modifying unit 14 is structured from a mechanism of changing a position and a direction of the recording medium M. In this case, the condition modifying unit 14 is structured from, for example, the shifting mechanism 14a for shifting a position of the recording medium M (or a stand on which the recording medium is placed) and the tilting mechanism 14b for changing a direction of the recording medium M.

In the storage unit 15, respective pictures imaged by the camera 13, information denoting imaging conditions for the respective pictures (illumination conditions, observational conditions, conditions of disposing the recording medium, and the like), pictures generated by the picture processing unit 16, and the like are stored. Further, a database 15a for storing attribute information for each recording medium M (or a certificate type of the recording medium M) is provided to the storage unit 15. Note that the above-described attribute information is information used at the time of verifying the recording medium M. The database 15a and the above-described attribute information will be described later in detail.

The picture processing unit 16 carries out various picture processes onto pictures of the recording medium M imaged by the camera 13 (pictures of the recording medium). Further, the picture processing unit 16 has a difference picture generating unit 16a, a vector analyzing unit 16b, a color difference analyzing unit 16c, a recognition unit 16d, and the like.

The difference picture generating unit 16a generates a difference picture between two pictures from these pictures. For example, the difference picture generating unit 16a generates a difference picture between adjacent pictures among a plurality of pictures imaged by the camera 13. Further, in the difference picture generating unit 16a, a difference picture between a reference picture stored in the storage unit 15 and a picture imaged by the camera 13 may be generated.

The vector analyzing unit 16b analyzes a moving direction and a moving distance of a specific design from a plurality of pictures, and generates a vector denoting an analysis result. However, a moving direction and a moving distance are for digitizing variations in a specific design which seems to be shifted in a plurality of sequential pictures. For example, the vector analyzing unit 16b generates a vector denoting variations in the specific design among pictures on which the specific design appears, among a plurality of pictures sequentially imaged by the camera 13.

The color difference analyzing unit 16c analyzes variations in colors in a plurality of pictures (variations in colors in specific areas in the respective pictures), and defines the analysis results as amounts of color difference. For example, the color difference analyzing unit 16c detects an amount of color difference with respect to an area whose colors vary in accordance with imaging conditions in pictures of the recording medium M.

The recognition unit 16d is to recognize information in a picture. Namely, the recognition unit 16d carries out the process of recognizing information such as characters in a picture of the recording medium M imaged by the camera 13. For example, the recognition unit 16d carries out the process of recognizing identification information (information including textual information denoting a certificate type (an attribute)) of the recording medium M as characters from a predetermined area in a picture of the recording medium M imaged by the camera 13, in the process of determining an attribute (type) of the recording medium which will be described later. Further, in the recognition unit 16d, a specific mark or the like denoting an attribute of the recording medium may be recognized in the process of determining an attribute of the recording medium which will be described later.

The display unit 17 is to display a variety of information. On the display unit 17, pictures stored in the storage unit 15, difference pictures generated by the picture processing unit 16, and the like are displayed. The operating unit 18 is operated by an operator. For example, the operating unit 18 is used in order for an operator to select a desired picture from the pictures displayed on the display unit 17. The interface unit 19 is an interface (I/F) for carrying out data communication with an external device.

Next, a relationship among the light source 12, the camera 13, and the recording medium M in the verification apparatus 10 will be described.

Figure 2:
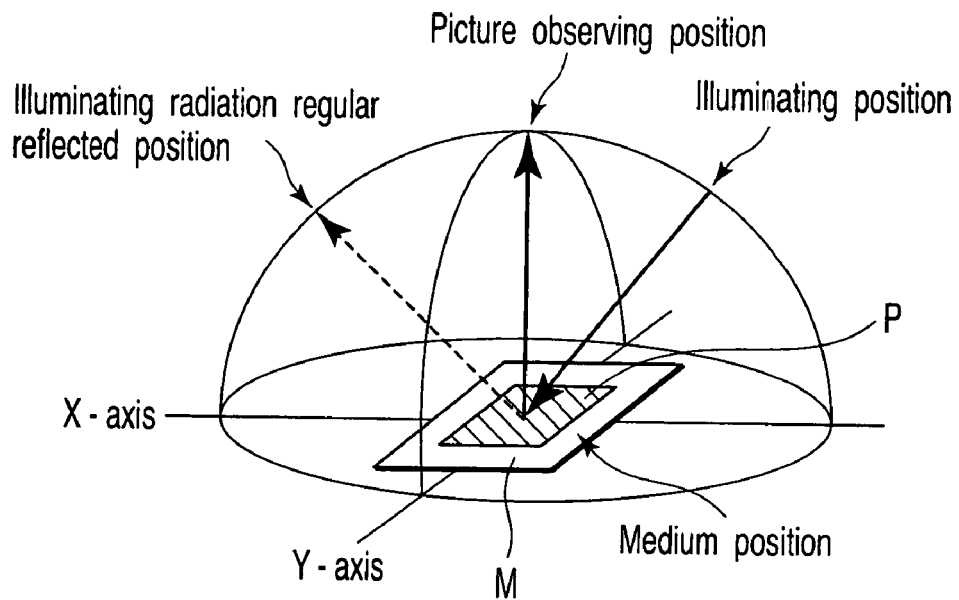
FIG. 2 is a diagram for explanation of a relative relationship among an illuminating position, a picture observing position, and a position of a recording medium.
Figure 3:
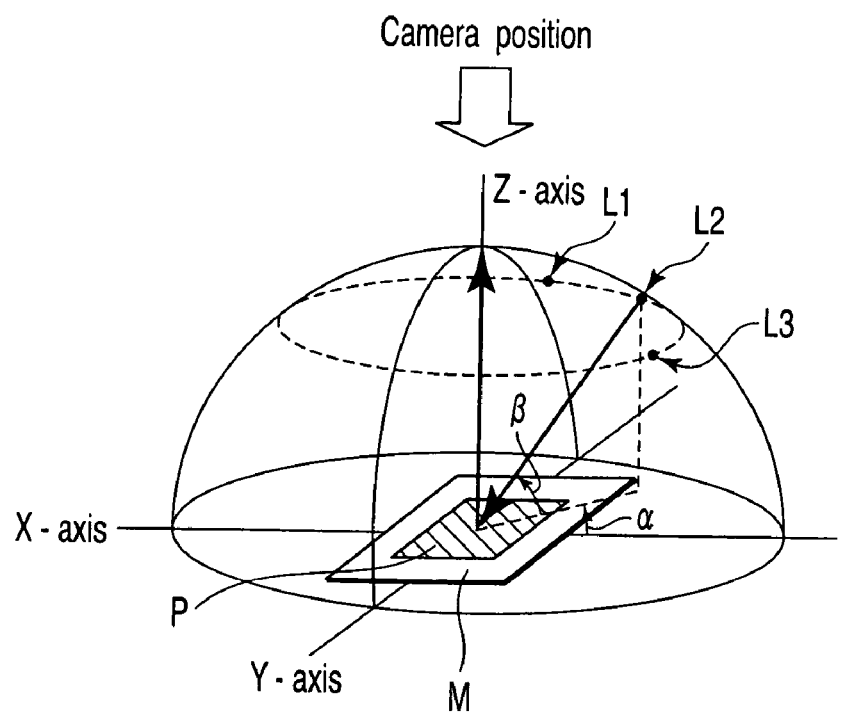
FIG. 3 is a diagram showing a relative relationship among a light source, a camera, and the recording medium.

FIGS. 2 and 3 are diagrams showing a relative relationship (positions and angles) among the light source 12, the camera 13, and the recording medium M.

Namely, in the verification apparatus 10, an optical relationship (imaging conditions) among the light source 12, the camera 13, and the recording medium M serves as a factor determining a state of a picture acquired from the recording medium M. For example, when an optical relationship among the light source 12, the camera 13, and the recording medium M is the same, the camera 13 images the same picture. In contrast thereto, when an optical relationship among the light source 12, the camera 13, and the recording medium M differs, the camera 13 images a different picture.

In the example shown in FIG. 2, various factors for determining a state of a picture acquired from the recording medium M are shown. As shown in FIG. 2, a picture of the imaged recording medium M (a state of the picture acquired from the recording medium M) is determined in accordance with illumination conditions, observational conditions for a picture, layout conditions for a recording medium, and the like. Here, these conditions are called imaging conditions.

The above-described illumination conditions are conditions of an illuminating radiation irradiated onto the recording medium M by the light source 12. For example, as illumination conditions, there are an illuminating position changing in accordance with a position of the light source 12, an illuminating angle changing in accordance with an orientation of the light source 12, and the like. If the structure is such that a type (wavelength, intensity) of an illuminating radiation from the light source 12 can be changed, a type of an illuminating radiation and the like may be illumination conditions.

The above-described observational conditions for a picture are conditions under which the camera 13 observes a picture of the recording medium M in the verification apparatus 10 (namely, conditions under which the camera 13 acquires a reflected light from the recording medium M as picture information). For example, as the above-described observational conditions, there are an observing position for a picture changing in accordance with a position of the camera 13, an observing angle for a picture changing in accordance with an orientation of the camera 13, and the like. Moreover, if the structure is such that it is possible to modify a sensitivity, a resolution, or the like of an optical element by which the camera 13 receives a reflected light, a sensitivity, a resolution, and the like may be observational conditions for a picture.

The above-described layout conditions for the recording medium M are conditions under which a recording medium serving as a verification object is disposed in the verification apparatus 10. For example, as the above-described layout conditions for the recording medium M, there are a layout position of the recording medium M, a layout angle of the recording medium M, and the like.

When one of various conditions as described above is modified, a state of a picture acquired from the recording medium M by the camera 13 is changed in the verification apparatus 10.

In the example shown in FIG. 2, a layout position of the recording medium M is set such that the recording medium M is disposed on an X-Y plane. Further, in the example shown in FIG. 2, observational conditions for a picture are set such that an observing position for a picture is set on the normal line (Z-axis) with respect to the X-Y plane passing through the central position of the recording medium M (or the central position in a picture area on the recording medium M) on the X-Y plane on which the recording medium M is disposed, and an observing angle for a picture is made to be directed to the center of the recording medium M.

Next, changes in a picture of the recording medium imaged by the camera 13 will be described.

FIG. 3 shows a state when a position of the light source 12 (an illuminating position) is changed in a state in which positions and angles of the camera 13 and the recording medium M are fixed. Namely, in the example shown in FIG. 3, the state when only illumination conditions (an illuminating position) are changed in a state in which observational conditions for a picture and layout conditions of the recording medium M are fixed is shown. A change in an illuminating position as shown in FIG. 3 is achieved by the condition modifying unit 14 (the shifting mechanism 14a and the tilting mechanism 14b).

Here, an illuminating position is denoted by a rotation angle α on the X-Y plane including an illuminating position, and an angle (elevation angle) β between a straight line connecting the illuminating position with the central position of the recording medium M and the X-Y plane including the central position of the recording medium M.

In this case, the shifting mechanism 14a is structured so as to shift the light source 12 on a hemisphere face centering on the central position of the recording medium M as shown in FIG. 3. For example, when an elevation angle β is constant, the shifting mechanism 14a rotationally shifts the light source 12 around the Z-axis (the normal line). Namely, the shifting mechanism 14a changes an rotation angle α of the light source 12 on the X-Y plane.

Further, the tilting mechanism 14b is structured so as to adjust an orientation of an illuminating radiation irradiated onto the recording medium M from the light source 12. In the example shown in FIG. 3, the tilting mechanism 14b is to change the elevation angle β. Namely, the tilting mechanism 14b adjusts an incident angle of light irradiated onto the recording medium M from the light source 12.

FIGS. 4A, 4B, 4C, 5A, 5B, and 5C show examples of pictures acquired from the recording medium M illuminated from various illuminating positions (observed pictures).

FIG. 4A is a diagram showing an example of an observed picture I1 of the recording medium M illuminated from an illuminating position L1 shown in FIG. 3. FIG. 4B is a diagram showing an example of an observed picture I2 of the recording medium M illuminated from an illuminating position L2 shown in FIG. 3. FIG. 4C is a diagram showing an example of an observed picture I3 of the recording medium M illuminated from an illuminating position L3 shown in FIG. 3. In FIGS. 4A, 4B, and 4C, a state in which a picture of the recording medium M changes in accordance with various illuminating positions is shown.

On the observed picture I1 shown in FIG. 4A, only a moon pattern a appears (is observed). In contrast thereto, as shown in FIG. 4B, on the observed picture I2, a star pattern b1 appears while a part thereof overlaps with the moon pattern a. As shown in FIG. 4C, on the observed picture I3, a star pattern b2 appears separately from the moon pattern a. Supposing that these observed pictures I1, I2, and I3 are pictures to be observed continuously, the picture formed on the recording medium M is observed such that the star comes out from behind the moon.

In other words, on the recording medium M observed as shown in FIGS. 4A, 4B, and 4C, the moon pattern a which appears (is observed) in any case of the illuminating positions L1, L2, and L3, the star pattern b1 which does not appear (is not observed) in cases of the illuminating positions L1 and L3, and the star pattern b2 which does not appear (is not observed) in cases of the illuminating positions L1 and L2 have been formed. Namely, on the recording medium M on which the pictures as shown in FIGS. 4A, 4B, and 4C are observed, the design (pattern) to be observed varies in accordance with a change in an illuminating position.

Further, FIG. 5A is a diagram showing an example of an observed picture J1 of the recording medium M illuminated from the illuminating position L1 shown in FIG. 3. FIG. 5B is a diagram showing an example of an observed picture J2 of the recording medium M illuminated from the illuminating position L2 shown in FIG. 3. FIG. 5C is a diagram showing an example of an observed picture J3 of the recording medium M illuminated from the illuminating position L3 shown in FIG. 3. FIGS. 5A, 5B, and 5C show a state in which colors of two areas E1 and E2 on the recording medium vary in accordance with an illuminating position.

On the observed picture J1 shown in FIG. 5A, it is shown that the area E1 is observed in blue, and the area E2 is observed in red. In contrast thereto, on the observed picture J2 shown in FIG. 5B, it is shown that the area E1 is observed in green, and the area E2 as well is observed in green. On the observed picture J3 shown in FIG. 5C, it is shown that the area E1 is observed in red, and the area E2 is observed in blue. Supposing that these observed pictures J1, J2, and J3 are pictures to be observed continuously, a color of the area E1 on the recording medium M is observed so as to vary in the order of blue, green, and red, and a color of the area E2 is observed so as to vary in the order of red, green, and blue. Namely, with respect to the recording medium M on which pictures as shown in FIGS. 5A, 5B, and 5C are observed, colors thereof vary in accordance with a change in an illuminating position.

Next, the process of setting imaging conditions used for the verification process of the recording medium will be described.

The setting process of imaging conditions which will be described hereinafter is the process for setting imaging conditions for imaging pictures for checking the quality of the recording medium M (picture of the recording medium M) (hereinafter called imaging conditions for verification). This is the process for setting imaging conditions for verification for every recording medium on which the same picture is formed (for example, recording media of the same certificate type). Such imaging conditions for verification are used as information for making the verification process for verifying a recording medium more efficient.

First, imaging conditions at the time of imaging a picture of the recording medium M will be described.

Figure 6:
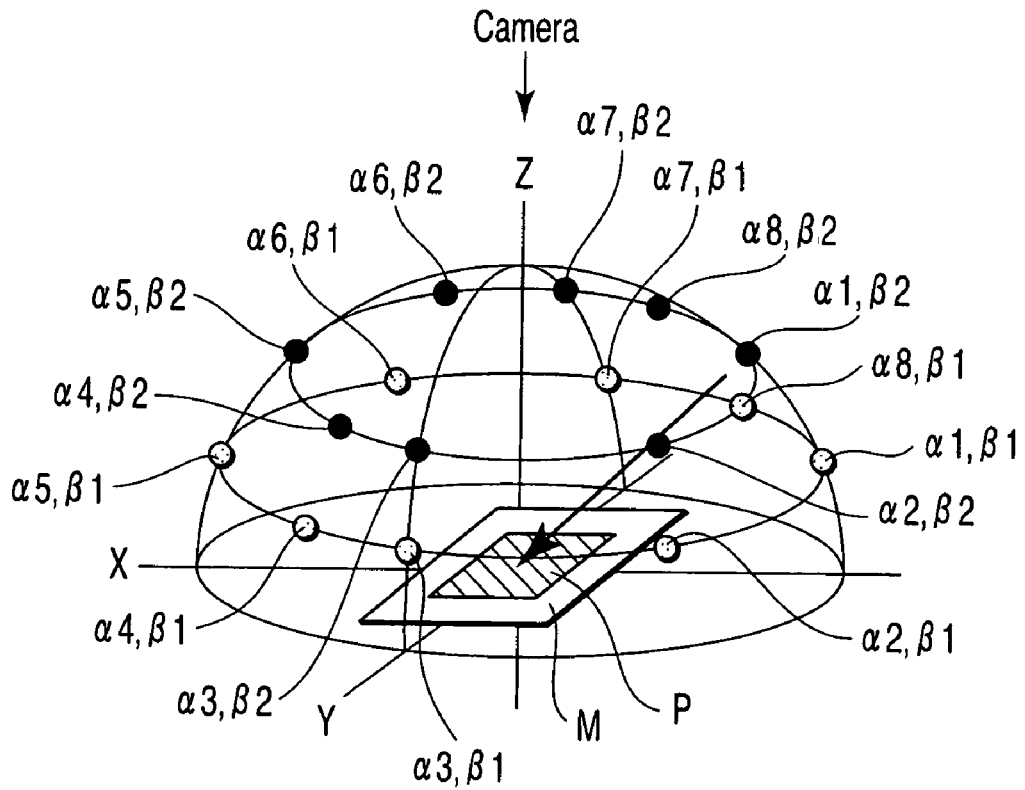
FIG. 6 is a diagram showing an example of illuminating positions at the time of imaging a picture of the recording medium.

FIG. 6 is a diagram showing an example of illuminating positions with respect to the recording medium M.

Here, an illuminating position with respect to the recording medium M is one of the imaging conditions at the time of imaging a picture of the recording medium M. Namely, when an illuminating position (position of the light source 12) is changed, an optical relationship (imaging conditions) among the light source 12, the recording medium M, and the camera 13 is changed. When the optical relationship is changed, a picture of the recording medium M imaged by the camera 13 (to be exact, a reflected light from the recording medium M imaged by the camera 13) is changed as well. In other words, a picture of the recording medium M imaged by the camera 13 changes in accordance with a change in an illuminating position.

The example shown in FIG. 6 shows various illuminating positions on a semispherical surface at the side at which the camera 13 is installed, of the spherical surface centering on the central position of the recording medium M. Further, in the example shown in FIG. 6, illuminating positions ($\alpha$, $\beta$) on the semispherical surface are denoted by use of rotation angles $\alpha$ and elevation angles $\beta$. For example, in the verification apparatus 10, while the light source 12 is made to revolve once around the Z-axis, the camera 13 installed on the Z-axis images the recording medium M at various elevation angles. In this manner, it is possible to image pictures of the recording medium M illuminated from the illuminating positions shown in FIG. 6.

Next, a display example of the pictures of the recording medium M imaged under various imaging conditions will be described.

Figure 7:
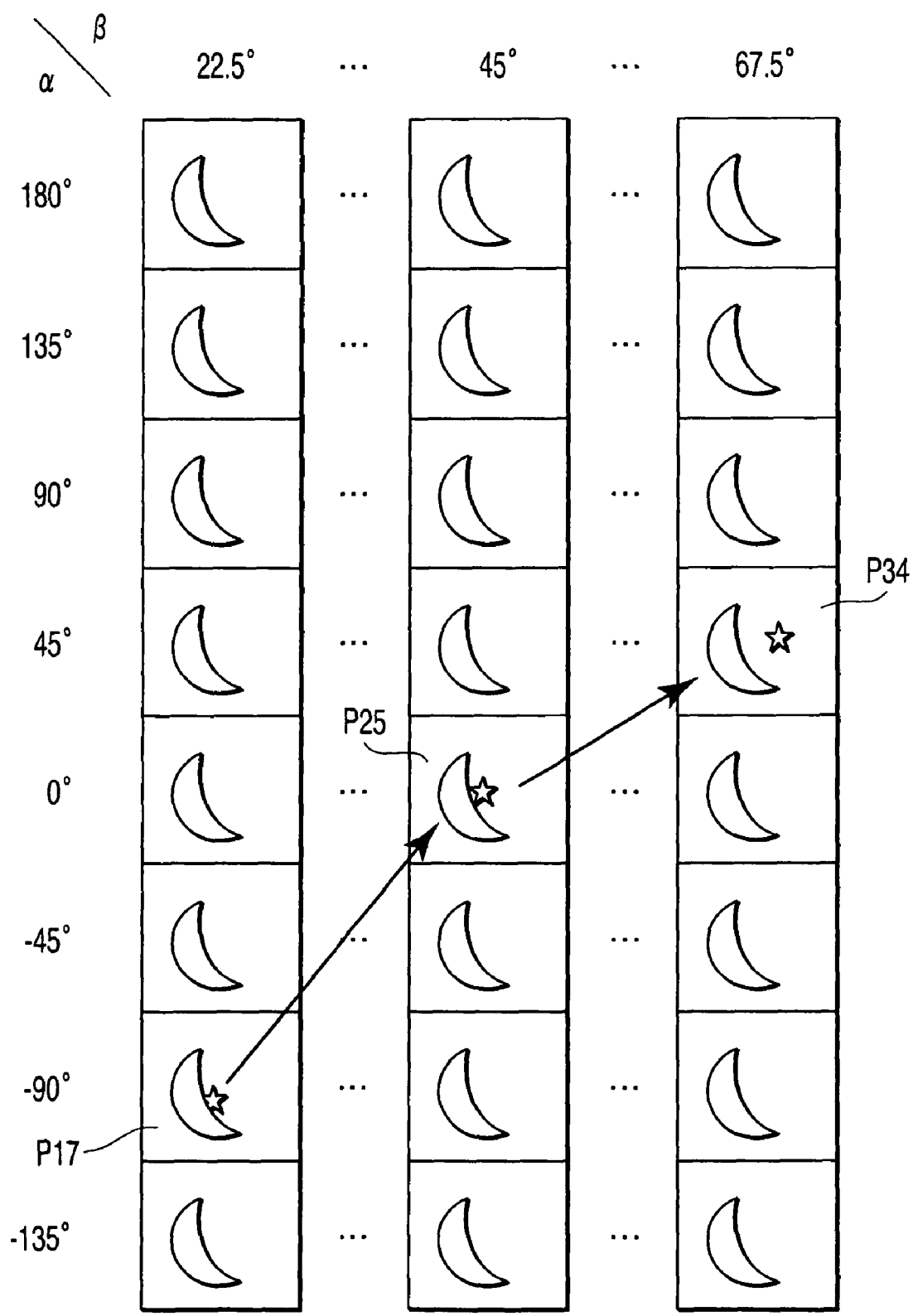
FIG. 7 is a diagram showing a display example of pictures of the recording medium illuminated from various illuminating positions.

FIG. 7 is a diagram showing an example of the pictures of the recording medium M imaged while being illuminated from various illuminating positions. Further, FIG. 7 is also a display example displayed on the display unit 17. The example shown in FIG. 7 shows the pictures of the recording medium M imaged while being illuminated from the respective illuminating positions ($\alpha$, $\beta$) so as to correspond to the rotation angles $\alpha$ and the elevation angles $\beta$ denoting the illuminating positions.

When a plurality of pictures imaged under various conditions as shown in FIG. 7 are displayed on the display unit 17, an operator selects at least one picture suitable for a picture for verification (a picture for judging the quality of the recording medium M) from the displayed pictures with the operating unit 18. When the operator selects a picture suitable for a picture for verification with the operating unit 18, the verification apparatus 10 judges conditions suitable for verifying a picture of the recording medium M (imaging conditions) on the basis of the conditions at the time of imaging the respective selected pictures.

Namely, when a picture suitable for a picture for verification is selected from the pictures of the recording medium illuminated from various illuminating positions as shown in FIG. 7, the verification apparatus 10 judges an order of shifting the light source 12 (an illumination route) through which a most suitable picture is efficiently imaged, on the basis of the respective illuminating positions at the time of imaging the respective pictures selected by the operator. Provided that the recording medium M is illuminated through such an illumination route, it is possible to efficiently carry out the control of illumination for imaging a suitable picture (the control of imaging environments).

For example, the example shown in FIG. 7 shows three pictures P17, P25, and P34 on which a star pattern appears along with a moon pattern. Suppose that the pictures on which the star pattern appears along with the moon pattern are pictures suitable for a picture for verification as a picture for verifying the recording medium M. In such a case, the operator selects the images P17, P25, and P34 as pictures suitable for verifying the recording medium M with the operating unit 18.

Next, a method for judging imaging conditions for verification from selected pictures will be described.

Figure 8:
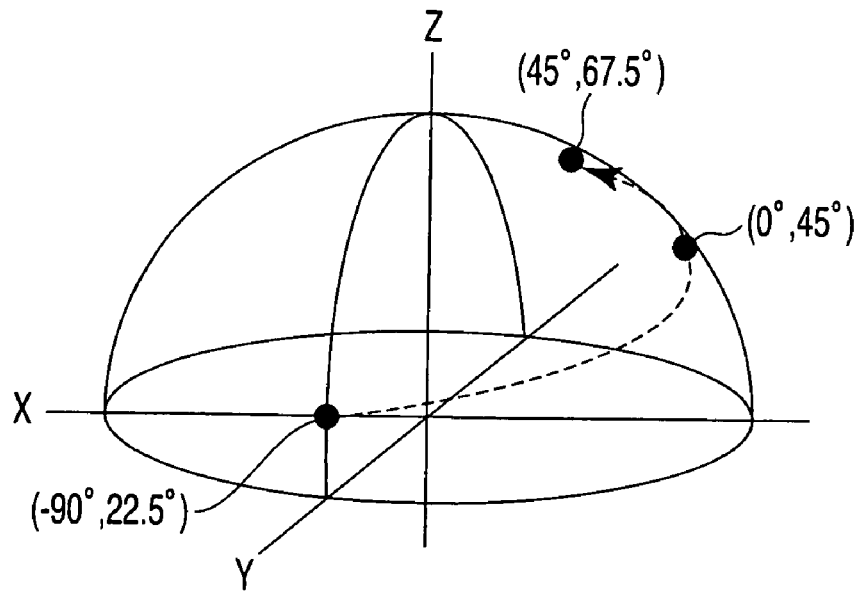
FIG. 8 is a diagram showing an example of an illumination route as imaging conditions for verification of a recording medium.

FIG. 8 is a diagram showing an example of an illumination route as imaging conditions for verification.

FIG. 8 shows an illumination route judged on the basis of the illuminating positions at the time of photographing the three pictures P17, P25, and P34 shown in FIG. 7, as an example of an imaging condition for verification. On the illumination route shown in FIG. 8, the light source 12 is shifted in the order of the illuminating position (−90°, 22.5°) of the picture P17, the illuminating position (0°, 45°) of the picture P25, and the illuminating position (45°, 67.5°) of the picture P34. Namely, provided that an illuminating position is shifted through the illumination route shown in FIG. 8, it is possible to efficiently carry out the imaging of the recording medium M at the illuminating positions from which it is possible to image a picture suitable for a picture for verification. Further, information denoting an illumination route as imaging conditions for verification as described above is stored in the storage unit 15 so as to correspond to information for identifying a type of the recording medium M.

Next, the setting process of imaging conditions for verification as described above will be described.

Figure 9:
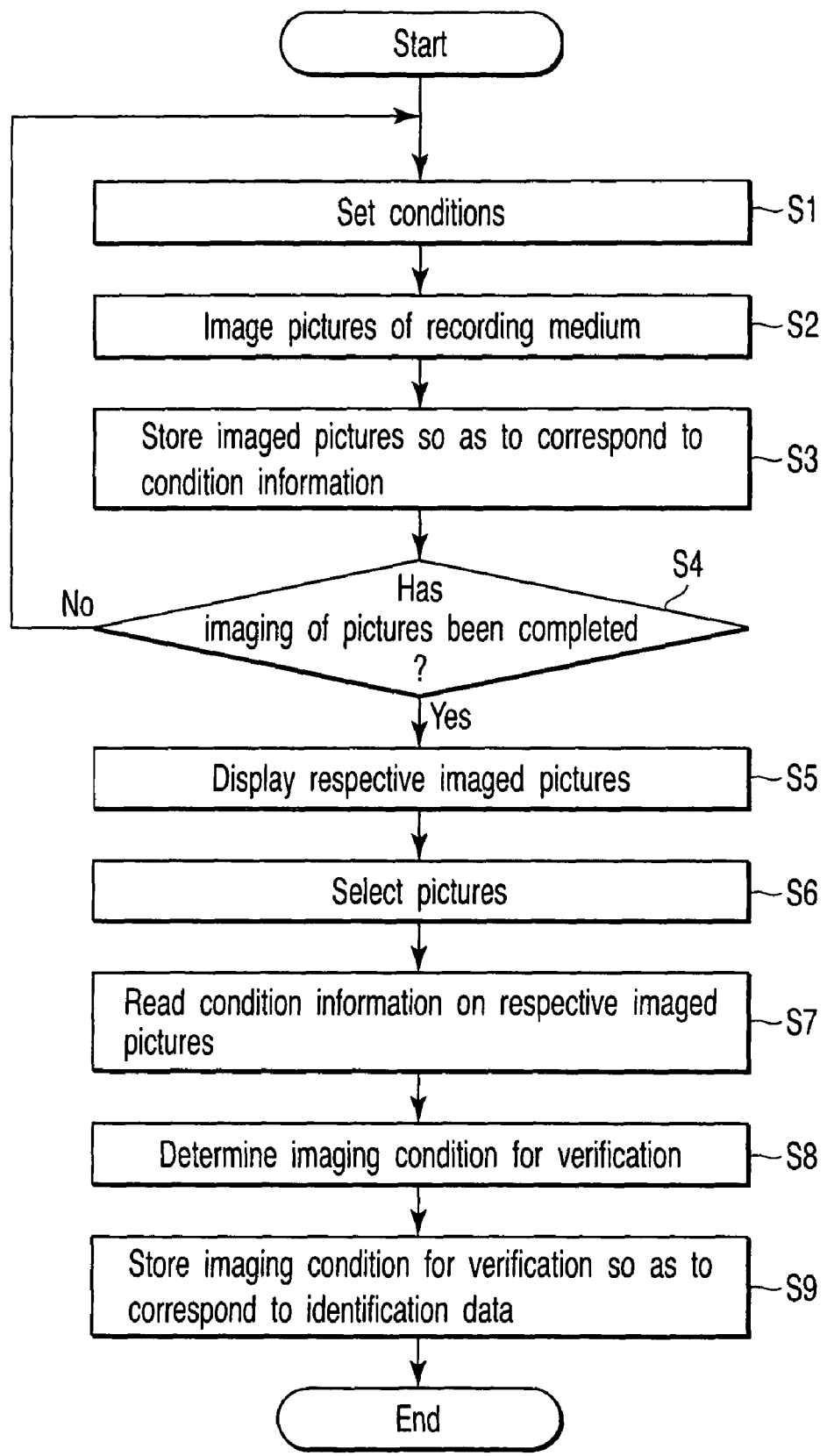
FIG. 9 is a flowchart for explanation of a procedure of processes for setting imaging conditions for verification.

FIG. 9 is a flowchart for schematic explanation of a procedure of the setting process of imaging conditions for verification.

First, the control unit 11 of the verification apparatus 10 sets a first condition as a condition for imaging a picture of the recording medium M with the condition modifying unit 14 (step S1). When a condition for imaging a picture of the recording medium M is set as the first condition, the control unit 11 images a picture P1 of the recording medium M with the camera 13 (step S2). When the picture P1 is imaged, the control unit 11 stores the picture P1 along with information denoting a condition (an illuminating position) at the time of imaging the picture P1, into the storage unit 15 (step S3). When the picture imaged with the camera 13 is stored, the control unit 11 judges whether or not the process of acquiring pictures of the recording medium M has been completed in accordance with whether or not the picture of the recording medium M has been imaged under all the predetermined conditions (step S4).

When it is judged that the process of acquiring pictures of the recording medium M has not been completed (step S4, NO), the control unit 11 sets another condition, and repeatedly executes the processes at steps S1 to S4. Further, when it is judged that the process of acquiring pictures of the recording medium M has been completed (step S4, YES), the control unit 11 terminates the process of acquiring pictures of the recording medium M for setting imaging conditions for the recording medium M.

When the process of acquiring pictures of the recording medium M for setting imaging conditions for the recording medium M has been completed, the control unit 11 displays the respective pictures of the recording medium stored in the storage unit 15 on the display unit 17 (step S5). In accordance therewith, the pictures of the recording medium M imaged under various conditions are displayed on the display unit 17. For example, on the display unit 17, as shown in FIG. 7, the pictures of the recording medium M imaged under various conditions are displayed in a list.

When the pictures imaged under various conditions are displayed on the display unit 17, the operator selects a picture suitable for a picture for verification from the plurality of pictures displayed on the display unit 17 with the operating unit 18 (step S6).

When the operator selects at least one picture with the operating unit 18, the control unit 11 reads the condition information made to correspond to the respective pictures selected by the operator (the information denoting the conditions at the time of photographing the respective pictures) out of the storage unit 15 (step S7). When the condition information on the respective pictures selected by the operator has been read out of the storage unit 15, the control unit 11 determines conditions for imaging a picture for verification (imaging conditions for verification) on the basis of the read condition information on the respective pictures (step S8). Namely, in the control unit 11, imaging conditions for verification are determined (prepared) by consolidating imaging conditions corresponding to the respective pictures selected by the operator. The imaging conditions for verification are, as described above, conditions for efficiently imaging a picture of the recording medium M under the same imaging conditions as those of the respective pictures selected by the operator. In other words, the control unit 11 determines conditions under which the respective pictures selected by the operator are efficiently imaged (or control information on the respective units and the like).

When the imaging conditions for verification are determined, the control unit 11 stores the information denoting the imaging conditions for verification so as to correspond to the identification information for identifying the recording medium M, or the certificate type information for identifying a certificate type of the recording medium M, into the database 15a of the storage unit 15 (step S9). In accordance therewith, it is possible to read out the imaging conditions for verification stored in the database 15a of the storage unit 15 by specifying the identification information of the recording medium M or the certificate type information of the recording medium M.

Next, one example of the setting process of imaging conditions for verification as described above will be described.

Figure 10:
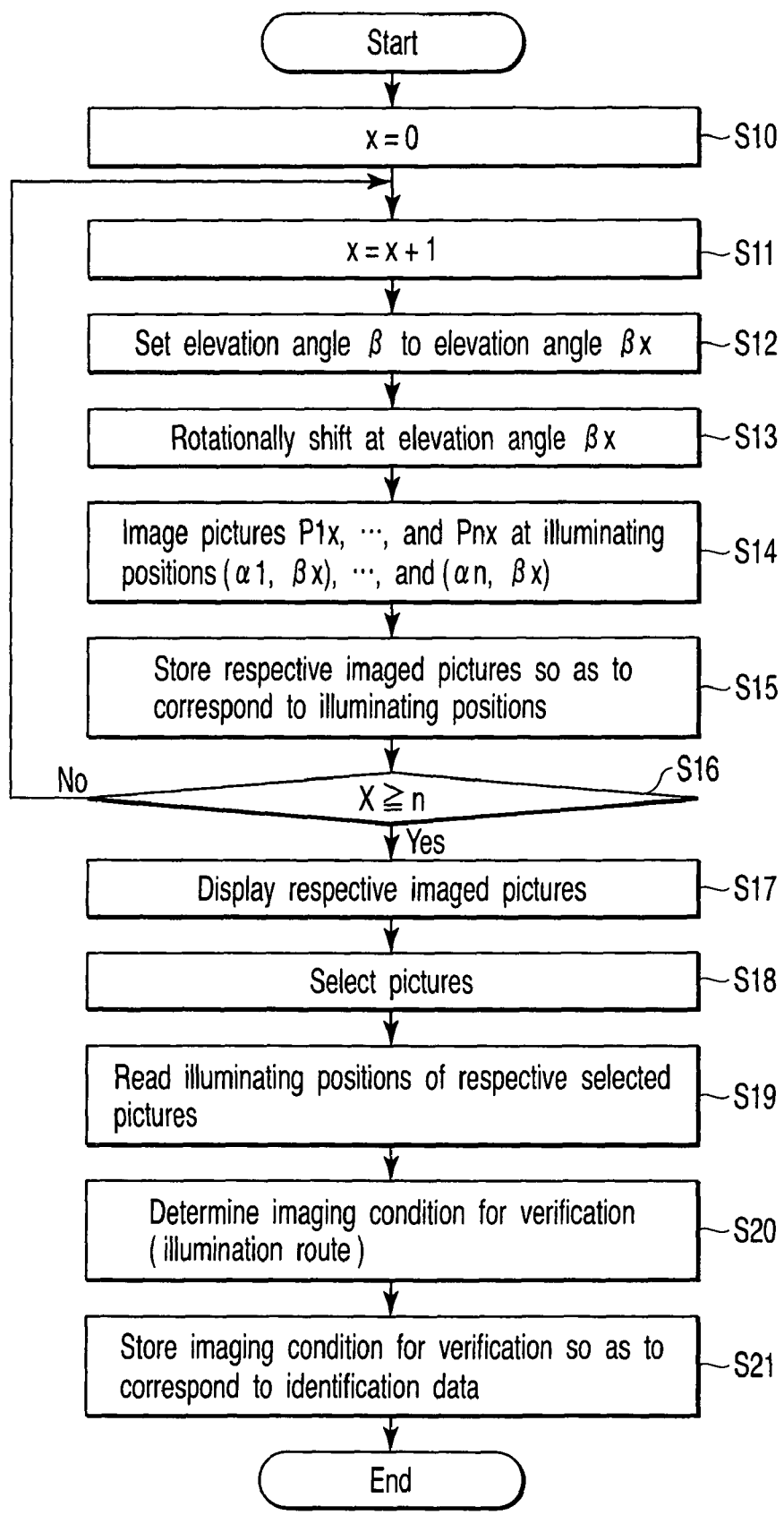
FIG. 10 is a flowchart for explanation of a process example when pictures of a recording medium illuminated from various illuminating positions are imaged.

FIG. 10 is a flowchart for explanation of a process example at the time of imaging pictures of the recording medium M illuminated from various illuminating positions in order to set imaging conditions for verification.

Here, pictures of the recording medium M are imaged while changing an illuminating position as illumination conditions in a state in which observational conditions for a picture and layout conditions of a recording medium are constant. Namely, as shown in FIG. 3, pictures of the recording medium M are imaged by the camera 13 whose position and orientation are fixed while illuminating the recording medium M set at a predetermined position with the light source 12 to be shifted. Further, here, a position of the light source 12 is made to revolve once around the Z-axis (rotation angles $\alpha1$ to $\alpha n$) by the shifting mechanism 14a at each of various elevation angles $\beta1$ to $\beta n$ set by the tilting mechanism 14b.

First, when the process of acquiring pictures of the recording medium M is started, the control unit 11 initializes a variable x (x=0) (step S10). Next, the control unit 11 sets the variable x to x=x+1 (step S11). When the variable x is set to x=x+1, the control unit 11 changes an angle of the light source 12 such that an elevation angle of the illuminating position is set to $\beta x$ by the tilting mechanism 14b (step S12). Here, suppose that $\beta1, \beta2, \ldots,$ and $\beta n$ are values stored in advance in the storage unit 15 or the like. When an elevation angle of the illuminating position is set to $\beta x$, the control unit 11 shifts the light source 12 by the shifting mechanism 14a so as to revolve around the Z-axis with an elevation angle of the illuminating position being $\beta x$ (step S13).

When the illuminating position is shifted around the Z-axis, the control unit 11 images a picture of the recording medium M with the camera 13 every time the illuminating position revolving around the Z-axis becomes a predetermined rotation angle ($\alpha 1, \alpha 2, \ldots,$ and $\alpha n$) (step S14). Further, the control unit 11 stores the imaged picture so as to correspond to the illuminating position at the time of photographing the picture every time a picture of the recording medium M is photographed at a predetermined rotation angle ($\alpha 1, \alpha 2, \ldots,$ and $\alpha n$).

When all the pictures of the recording medium M illuminated from the respective predetermined rotation angles have been imaged, the control unit 11 judges whether it is $x \geq n$ or not (step S16). Here, suppose that the elevation angle $\beta n$ is a maximum value among the predetermined elevation angles. In other words, the control unit 11 judges whether or not the imaging of pictures of the recording medium M illuminated from all the elevation angles has been completed. When it is judged that it is not $x \geq n$ by the above-described judgment (step S16, NO), the control unit 11 returns to the step S11, and repeatedly executes the processes described above. Further, when it is judged that it is $x \geq n$ by the above-described judgment (step S16, YES), the control unit 11 completes the process of acquiring pictures of the recording medium M illuminated from various illuminating positions, and proceeds to the step S17.

For example, the control unit 11 sets the elevation angle $\beta$ to the first elevation angle $\beta 1$ with the tilting mechanism 14b of the condition modifying unit 14, and shifts the light source 12 so as to revolve around the Z-axis with the shifting mechanism 14a of the condition modifying unit 14. Every time an illuminating position of the light source 12 shifted by the shifting mechanism 14a reaches a predetermined rotation angle, the control unit 11 images a picture of the recording medium M. In accordance therewith, pictures P11 to Pn of the recording medium M illuminated from illuminating positions ($\alpha 1, \beta 1$), ($\alpha 2, \beta 1$), . . . , and ($\alpha n, \beta 1$) are imaged by the camera 13. The pictures P11 to Pn imaged by the camera 13 are stored as pictures in a first condition group (11th to 1*n*-th conditions) into the storage unit 15 along with the information denoting the illuminating positions at the time of photographing the respective pictures P11 to Pn.

Namely, the control unit 11 carries out the process as described above at each of the respective predetermined elevation angles $\beta 1, \beta 2, \ldots,$ and $\beta n$. In this manner, the control unit 11 images pictures P11 to P1*n*, P21 to P2*n*, . . . , and Pn1 to Pnn of the recording medium M illuminated from various illuminating positions ($\alpha 1, \beta 1$) to ($\alpha 1, \beta n$), ($\alpha 2, \beta 1$) to ($\alpha 2, \beta n$), . . . , and ($\alpha n, \beta 1$) to ($\alpha n, \beta n$) which are denoted by rotation angles $\alpha$ and elevation angles $\beta$. These pictures P11 to P1*n* (the respective pictures in the first condition group), P21 to P2*n* (the respective pictures in the second condition group), . . . , and Pn1 to Pnn (the respective pictures in the n-th condition group) are stored into the storage unit 15 so as to correspond to the information denoting the illuminating positions (the condition information).

As described above, when the process of acquiring pictures of the recording medium M illuminated from various illuminating positions has been completed, the control unit 11 displays the pictures P11 to P1*n*, P21 to P2*n*, . . . , and Pn1 to Pnn stored in the storage unit 15 on the display unit 17 (step S17). For example, in the display example shown in FIG. 7, the respective pictures are displayed so as to be arranged in lines with rotation angles $\alpha$ being the vertical axis and elevation angles $\beta$ being the horizontal axis.

Note that, for example, depending on a state of a picture formed on the recording medium M, a difference picture between the picture and a picture adjacent thereto is preferably displayed in some cases. In such a case, the control unit 11 generates difference pictures from the plurality of pictures P11 to P1*n*, P21 to P2*n*, . . . , and Pn1 to Pnn stored in the storage unit 15 with pictures adjacent thereto with the difference picture generating unit 16a of the picture processing unit 16, and displays those difference pictures on the display unit 17. Further, this may be structured such that it is possible for the operator to select whether the respective imaged pictures are displayed or the difference pictures are displayed on the display unit 17 with the operating unit 18.

When the pictures of the recording medium M illuminated from various illuminating positions are displayed on the display unit 17, the operator selects a picture suitable for a picture for verification from among the displayed pictures with the operating unit 18. For example, in the display example shown in FIG. 7, the operator selects the three pictures P17, P25, and P34 as pictures on which the moon pattern and the star pattern satisfactorily appear (i.e., pictures suitable for a picture for verification) with the operating unit 18.

Note that, when the display unit 17 and the operating unit 18 are structured from a liquid crystal display device having a built-in touch panel, the operator touches an area on which a desired picture is displayed. Further, when the operating unit 18 is structured from a pointing device such as a mouse, the operator specifies an area on which a desired picture is displayed with the pointing device.

When a specific picture is selected by the operating unit 18 (step S18), the control unit 11 reads the information denoting the respective illuminating positions ($\alpha, \beta$) corresponding to these plurality of selected pictures out of the storage unit 15 (step S19). The information denoting these illuminating positions is conditions for imaging the picture groups suitable for a picture for verification.

When the information denoting the respective illuminating positions of the respective pictures selected by the operating unit 18 are read out, the control unit 11 determines a route (an illumination route) for shifting the light source (an illuminating position) 12 so as to connect the respective illuminating positions corresponding to the respective pictures, as imaging conditions for verification (step S20). For example, when the three pictures shown in FIG. 7 are selected, an illumination route shown by the broken line in FIG. 8 is determined as imaging conditions for verification.

The illumination route as described above is imaging conditions for imaging pictures for verifying the recording medium M (or a recording medium having the same certificate type as the recording medium M) (imaging conditions for verification). Accordingly, when an illumination route as imaging conditions for verification is determined, the control unit 11 stores the information denoting the illumination route (verification conditions for verification) so as to correspond to the identification information for identifying the recording medium M (or the identification information for identifying a certificate type of the recording medium) into the database 15a of the storage unit 15 (step S21).

Note that the information such as the imaging conditions for verification stored in the database 15a of the storage unit 15 may be utilized by an external device capable of carrying out data communication with the verification apparatus 10 via the interface unit 19. Further, the information such as the imaging conditions for verification may be stored in a storage unit of an external device connected via the interface unit 19 to the verification apparatus 10. Namely, the information such as the imaging conditions for verification may be commoditized so as to be utilized by an external device such as another inspection apparatus.

In accordance with process as described above, the imaging conditions made to correspond to the identification information for the recording medium are stored in the storage unit 15. The information stored in the storage unit 15 can be read out by specifying the identification information. For example, in the verification apparatus 10, it suffices to read out the imaging conditions for verification corresponding to the identification information specified with the operating unit 18 by the operator. Namely, when a recording medium on which the same picture as that of the recording medium M is formed is verified, it is possible for the verification apparatus 10 to easily photograph a picture for verification under suitable imaging conditions in the verification process of the recording medium by reading out the imaging conditions for verification corresponding to the specified identification information.

For example, as the verification process of the recording medium M, a picture group of the recording medium imaged under the imaging conditions for verification is displayed on the display unit 17. In this manner, it is possible for the operator to view only the picture group imaged under the suitable imaging conditions for verification. As a result, it is possible for the operator to easily judge the quality of the picture formed on the recording medium or the authenticity of the recording medium.

Note that the verification apparatus 10 may be structured such that a plurality of light sources for illuminating the recording medium M are disposed at various illuminating positions instead of shifting the one light source 12, and an illuminating position is changed by controlling the lighting of those light sources. In this case, the condition modifying unit 14 is structured from the one which controls lighting of the respective light sources. In accordance with such a structure, the verification apparatus 10 is capable of lighting the respective light sources in sequence in order to change an illuminating position. Further, in accordance with such a structure, it is possible to light the plurality of light sources simultaneously. It is possible to install light sources of illuminating lights having different wavelengths.

Further, as described above, any structure suffices provided that the condition modifying unit 14 is capable of changing conditions for an optical system at the time of photographing a picture of the recording medium M. Namely, in the verification apparatus 10, the camera 13 or the recording medium M may be shifted. Moreover, in the verification apparatus 10, a plurality of cameras for imaging pictures of the recording medium M may be disposed at various positions (observing positions for a picture).

Next, the verification process of the recording medium in the verification apparatus 10 will be described.

First, an example of the recording medium M serving as a verification object will be described.

FIG. 11 is a diagram showing the example of the recording medium M serving as a verification object.

A character area T and a picture area G are formed on the recording medium M shown in FIG. 11. Moreover, in the picture area G, there are an area g1 in which a design changes in accordance with optical conditions, and an area g2 in which colors change in accordance with optical conditions.

Further, characters are formed in the character area T. The characters formed in the character area T are, for example, information denoting a certificate type (an attribute) of the recording medium M, identification information for identifying the recording medium M, or information such as a name of an owner of the recording medium M. Note that, here, it is assumed that at least character information denoting a certificate type of the recording medium M is formed in the character area T. The character information denoting a certificate type of the recording medium M formed in the character area T is to be recognized by the recognition unit 16d.

A picture formed in the area g1 of the picture area G is the one whose design (pattern) which is visibly recognizable changes in accordance with optical conditions as shown in FIGS. 4A, 4B, and 4C. Namely, the picture formed in the area g1 changes in accordance with imaging conditions such as illumination conditions, observational conditions, or layout conditions of the recording medium M.

A picture formed in the area g2 of the picture area G is the one whose colors change in accordance with optical conditions as shown in FIGS. 5A, 5B, and 5C. Namely, the picture formed in the area g2 changes in accordance with imaging conditions such as illumination conditions, observational conditions, or layout conditions of the recording medium M.

Next, the information stored in the database 15a of the storage unit 15 will be described.

Attribute information (setting information for verification process) is stored for each certificate type of recording media in the database 15a. The above-described attribute information is information on the verification process with respect to respective certificate types of recording media. Namely, the verification process with respect to respective certificate types of recording media is executed on the basis of the attribute information of each certificate type. As the attribute information, in addition to the information denoting the imaging conditions for verification (illumination conditions, observational conditions, layout conditions) (hereinafter called imaging condition information), there are, for example, layout information, image analysis information, display condition information, reference picture information, process content information, and the like.

The above-described imaging condition information is, for example, imaging condition information for verification determined by the setting process described above. The above-described imaging condition information is information denoting conditions for imaging a picture of a recording medium serving as a verification object as verification process. Namely, imaging conditions for a picture corresponding to a certificate type of a recording medium serving as a verification object are shown by the above-described imaging condition information. For example, the above-described imaging condition information is information on illumination conditions, observational conditions for a picture, layout conditions of a recording medium, or the like.

The layout information is information denoting positions of various areas on a recording medium. Namely, positions of respective areas on various certificate types of recording media serving as verification objects are shown by layout information. For example, with respect to the recording medium M as shown in FIG. 11, the information denoting positions of the character area T, the picture area G, the area g1, the area g2, or the like is set as layout information.

The above-described picture analysis information shows the contents of analysis process to be executed with respect to a picture of the recording medium M serving as a verification object. Namely, the contents of analysis process corresponding to a certificate type of a recording medium serving as a verification object is denoted by the picture analysis information. For example, in the picture analysis information, information denoting the contents of analysis process for obtaining auxiliary information to be displayed on the display unit 17 along with a picture of a recording medium serving as a verification object is stored. Further, as the above-described picture analysis information, information denoting a character area, information denoting a picture area, information denoting the area g1 in the picture area, and information denoting the area g2 in the picture area in a picture of the recording medium M are included. Further, in the above-described picture analysis information, information on process contents to be executed with respect to the character area (here, character recognition process), process contents to be executed with respect to the area g1 (here, generating process of difference pictures, vector analysis, and the like), process contents to be executed with respect to the area g2 (here, color difference calculation process), or the like is stored.

The display condition information is information denoting contents to be displayed on the display unit 17. Namely, display contents corresponding to a certificate type of a recording medium serving as a verification object are denoted by the display condition information. Further, in the display condition information, it is possible to set contents to be displayed for each picture in the respective areas. For example, in the display condition information, with respect to a picture in the area g1, it is possible to display a dynamic image, a difference picture, and a vector, and with respect to a picture in the area g2, it is possible to display a dynamic image and color difference information.

The above-described reference picture information is information on a picture to be a reference as a picture of recording media in each certificate type. Namely, the reference picture information is a reference picture to be displayed on the display unit 17 so as to be arranged with a picture of a recording medium serving as a verification object. Note that, in the reference picture information, information of a picture to be a reference corresponding to the display contents denoted by the display condition information is included. For example, when a dynamic image, a difference picture, a vector, an amount of color difference, and the like which are obtained by imaging a recording medium serving as a verification object are displayed on the display unit 17, information denoting the dynamic image, the difference picture, the vector, the amount of color difference, or the like as a reference picture is stored as reference picture information in the database 15a. Further, in the reference picture information, it is possible to set a picture to be a reference for each picture in the respective areas. For example, in the reference picture information, with respect to the area g1, it is possible to set a dynamic image, a difference picture, and a vector which are to be references, and with respect to the area g2, it is possible to set a dynamic image and color difference information which are to be references.

Next, the information to be displayed on the display unit 17 for verifying the recording medium M will be described.

Here, three pictures in the area g1 and three pictures in the area g2 of the recording medium illuminated from the illuminating positions L1, L2, and L3 are assumed. Here, for purposes of the description, the six pictures as described above will be called as follows.

The picture in the area g1 imaged in a state at the illuminating position L1: XY-P1_Pra001

The picture in the area g1 imaged in a state at the illuminating position L2: XY-P1_Pra002

The picture in the area g1 imaged in a state at the illuminating position L3: XY-P1_Pra003

The picture in the area g2 imaged in a state at the illuminating position L1: XY-P2_Pra001

The picture in the area g2 imaged in a state at the illuminating position L2: XY-P2_Pra002

The picture in the area g2 imaged in a state at the illuminating position L3: XY-P2_Pra003

Hereinafter, in order to verify a picture in the area g1 or a picture in the area g2 on the recording medium M, information to be displayed on the display unit 17 will be described.

FIG. 12 is a diagram showing a display example for verifying a picture in the area g1 on the recording medium M.

In the display example shown in FIG. 12, a variety of information on the pictures in the area g1 on the recording medium M photographed by the camera 13 is displayed on the display unit 17 so as to correspond to a variety of information on a picture in the area g1 to be a reference. The information to be displayed on the display unit 17 in order to verify the pictures in the area g1 is set by the display condition information. In the display example shown in FIG. 12, as the display condition information, in addition to the pictures (the dynamic image) of the recording medium M imaged by the camera 13, the difference pictures generated from the picture groups photographed by the camera 13 and a vector (a vector denoting variations in a specific design) are displayed.

As shown in FIG. 12, information to be displayed on the display unit 17 is set by display condition information of each attribute (certificate type) stored in the database 15a. Further, reference picture information (a dynamic image to be a reference, a difference picture to be a reference, a vector to be a reference) as well is stored in the database 15a for each attribute (certificate type). Accordingly, the display example shown in FIG. 12 is generated from the pictures imaged by the camera 13, the display condition information corresponding to the certificate type of the recording medium, and the reference picture information corresponding to the certificate type of the recording medium.

Namely, in the display example shown in FIG. 12, the picture (dynamic image) in the area g1 on the recording medium M imaged by the camera 13 under imaging conditions corresponding to the certificate type, and the picture (dynamic image) in the area g1 to be a reference are displayed so as to correspond to one another.

Namely, in the display example shown in FIG. 12, the difference picture generated from a plurality of the pictures in the area g1 on the recording medium M imaged by the camera 13 under the imaging conditions corresponding to the certificate type, and the difference picture in the area g1 to be a reference are displayed so as to correspond to one another. The difference picture is generated by the difference picture generating unit 16a of the picture processing unit 16 in accordance with the image analysis information made to correspond to the certificate type. The difference picture is information set as auxiliary information for verifying the recording medium (the picture in the area g1).

Moreover, in the display example shown in FIG. 12, the vector denoting a moving direction and a moving distance of a specific design (the star pattern in the example shown in FIG. 12) generated from a plurality of the pictures in the area g1 on the recording medium M imaged by the camera 13 under the imaging conditions corresponding to the certificate type, and a vector to be a reference are displayed so as to correspond to one another. The vector is generated by the vector analyzing unit 16b of the picture processing unit 16 in accordance with the image analysis information made to correspond to the certificate type. The vector is information set as auxiliary information for verifying the recording medium (the picture in the area g1). Note that, the vector denotes a moving direction and a moving distance of a specific design appearing or disappearing in accordance with imaging conditions.

Namely, in the display example shown in FIG. 12, not only pictures (a picture group) under imaging conditions made to correspond to a certificate type, but also auxiliary information obtained from the picture group (a difference pictures, a vector) are displayed so as to correspond to the information to be a reference. In accordance therewith, it is possible for the operator to judge the authenticity of the recording medium with reference not only to the pictures of the recording medium, but also to the difference picture or the vector denoting the change in the specific design as auxiliary information.

Figure 13:
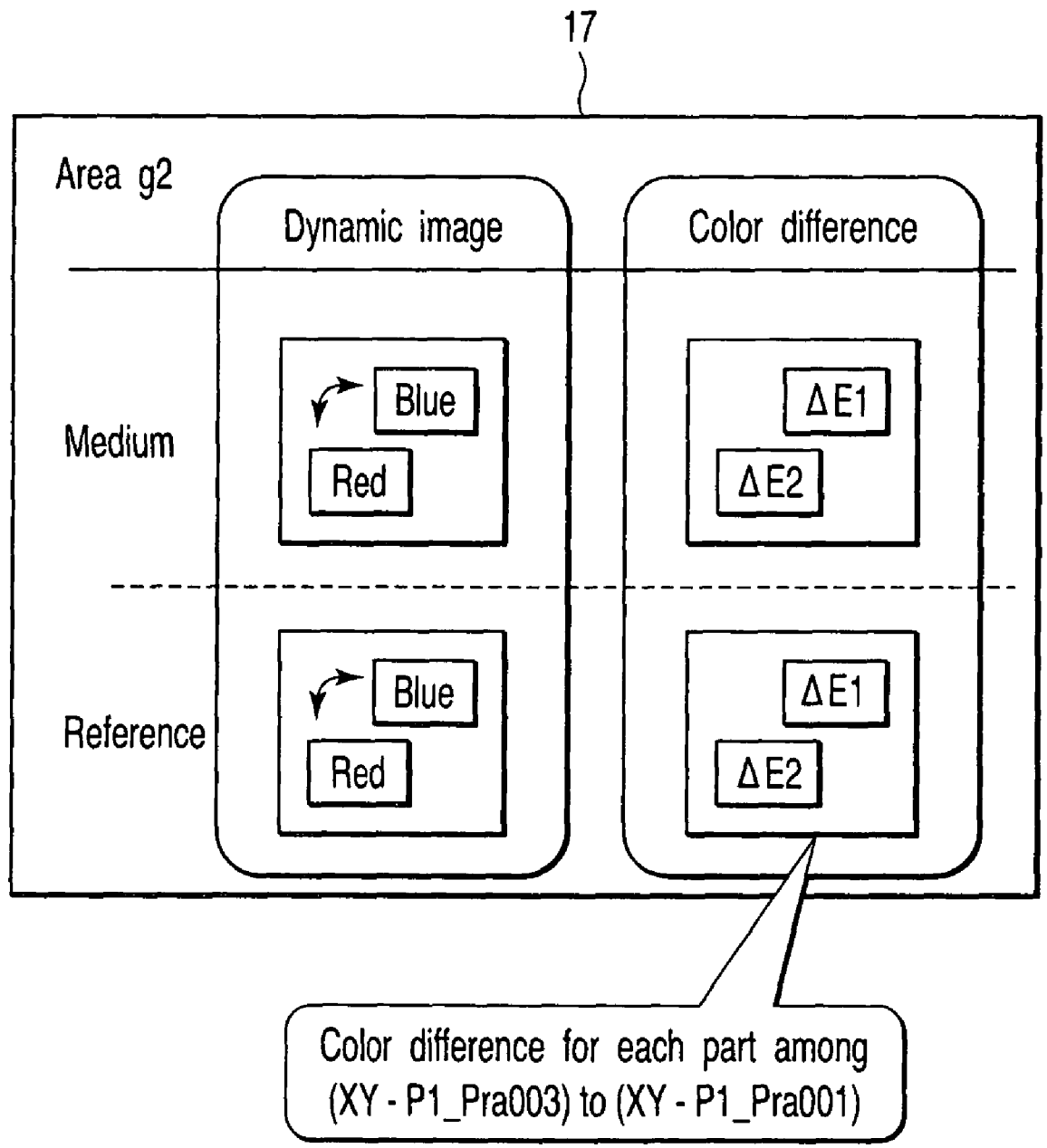
FIG. 13 is a diagram showing a display example for verifying a picture in a second area on the recording medium.

FIG. 13 is a diagram showing a display example for verifying a picture in the area g2 on the recording medium.

In the display example shown in FIG. 13, a variety of information on the picture in the area g2 on the recording medium M photographed by the camera 13 is displayed on the display unit 17 so as to correspond to a variety of information on a picture in the area g2 to be a reference. The information to be displayed on the display unit 17 in order to verify the pictures in the area g2 is set by the display condition information. In the display example shown in FIG. 13, as the display condition information, in addition to the pictures (the dynamic image) of the recording medium M imaged by the camera 13, an amount of color difference (information denoting a change in colors) for each of the specific areas E1 and E2 generated from the picture groups imaged by the camera 13 is displayed.

As shown in FIG. 13, the information to be displayed on the display unit 17 is set by display condition information of each attribute (certificate type) stored in the database 15a. Namely, the display example shown in FIG. 13 is generated from the pictures imaged by the camera 13, the display condition information corresponding to the certificate type of the recording medium, and the reference picture information corresponding to the certificate type of the recording medium.

For example, in the display example shown in FIG. 13, the picture (dynamic image) in the area g2 on the recording medium M imaged by the camera 13 under imaging conditions corresponding to the certificate type, and the picture (dynamic image) in the area g1 to be a reference are displayed so as to correspond to one another.

Further, in the display example shown in FIG. 13, the amounts of color differences (the variations in colors) in the predetermined areas E1 and E2 generated from a plurality of the pictures in the area g2 on the recording medium M imaged by the camera 13 under imaging conditions corresponding to the certificate type, and the amounts of color differences in the predetermined areas E1 and E2 in the area g2 to be a reference are displayed so as to correspond to one another. Those amounts of color differences are generated by the color difference analyzing unit 16c of the picture processing unit 16 in accordance with the image analysis information made to correspond to the certificate type. The amounts of color differences are information set as auxiliary information for verifying the recording medium (the pictures in the area g2).

Namely, in the display example shown in FIG. 13, not only the pictures (picture group) imaged under the imaging conditions made to correspond to the certificate type, but also the auxiliary information obtained from the picture group (amounts of color differences) are displayed so as to correspond to the information to be a reference. In accordance therewith, it is possible for the operator to judge the authenticity of the recording medium with reference not only to the pictures of the recording medium, but also to the amounts of color differences (i.e., variations in colors) as auxiliary information.

Next, the procedure of the verification process of the recording medium M will be described.

Figure 14:
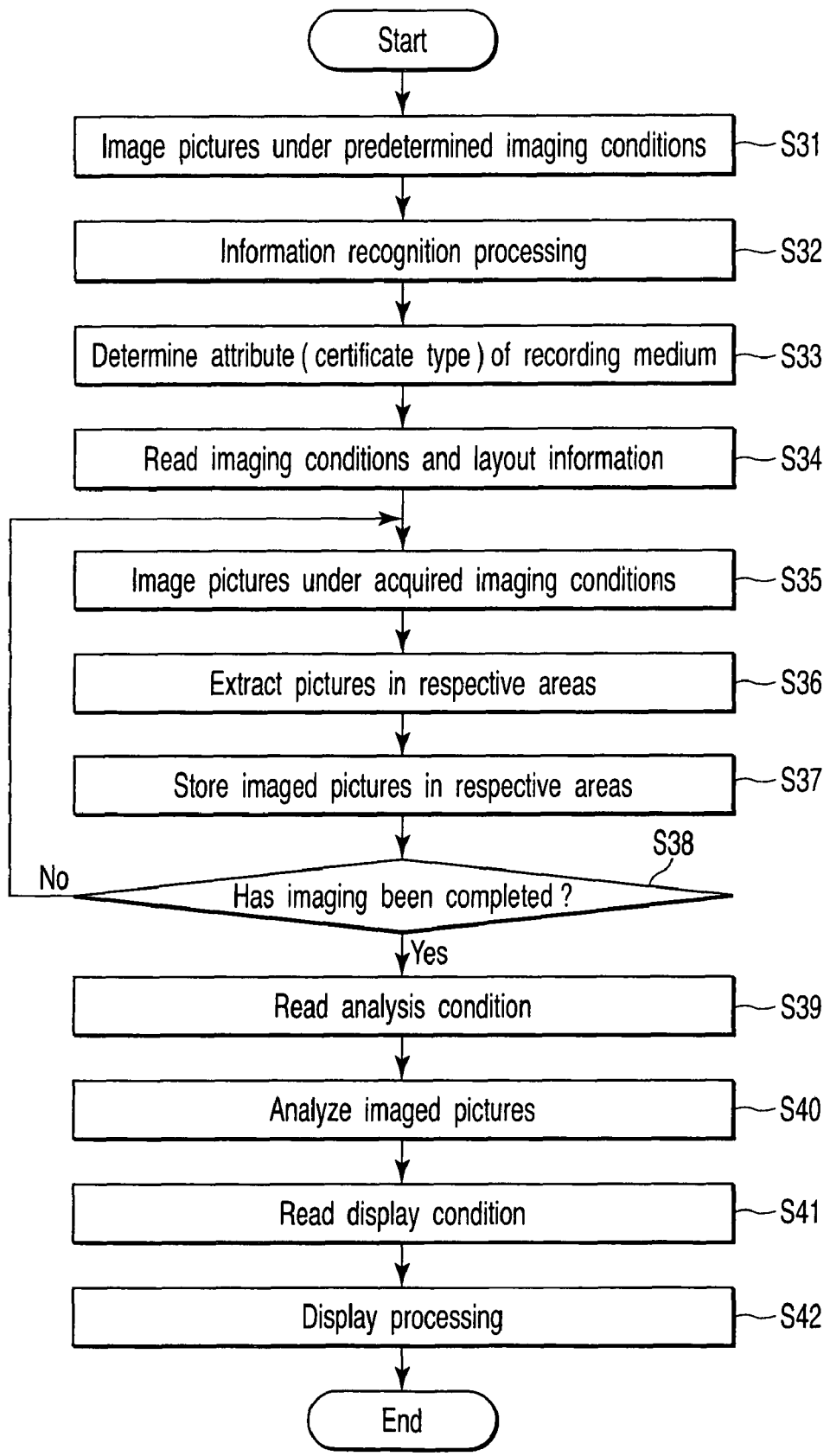
FIG. 14 is a flowchart for explanation of a procedure of processes for verifying the recording medium.

FIG. 14 is a flowchart for explanation of the procedure of the verification process of the recording medium M.

First, the recording medium M serving as a verification object is set at a predetermined position. In a state in which the recording medium M serving as a verification object is set at a predetermined position, the control unit 11 images a picture of the recording medium M under a predetermined imaging condition determined in advance (step S31). At this time, as the predetermined imaging conditions, imaging conditions suitable for recognizing the character information formed on the recording medium M are applied. Further, at this point in time, because a certificate type (an attribute) of the recording medium M serving as a verification object has not been ascertained, a character area on the recording medium M as well has not been determined. Therefore, the control unit 11 images a picture of the entire surface on the recording medium M with the camera 13. The picture imaged by the camera 13 is stored in the storage unit 15.

When the picture of the recording medium M is stored in the storage unit 15, the control unit 11 carries out recognition process of recognizing character information in the picture of the recording medium M (character information including information denoting an attribute) with the recognition unit 16d of the picture processing unit 16 (step S32). In the recognition process, a character area T is detected from the picture of the recording medium M, and respective characters are recognized from the detected character area. When a result of the character recognition by the recognition unit 16d is obtained, the control unit 11 determines a certificate type (an attribute) of the recording medium M on the basis of the result of the character recognition (step S33).

Note that the processes at the steps S32 and S33 are processes for determining an attribute of a recording medium serving as a verification object. Therefore, when a mark or the like denoting an attribute is formed on a recording medium serving as a verification object, the mark denoting the attribute of the recording medium may be recognized in the processes at the steps S31 to S33.

Moreover, in the processes at the steps S31 to S33, an attribute of the recording medium M serving as a verification object may be determined by a method different from the method described above. For example, when the recording medium M has a storage unit which stores information of an IC card, a magnetic card, or the like, the card reader 20 may read the information denoting the attribute of the recording medium M from the storage unit of the recording medium M. In this case, in the control unit 11, instead of the processes at the steps S31 to S33 described above, the card reader 20 reads the information denoting the attribute from the recording medium M, and executes process of determining the attribute from the read information.

Further, an attribute of the recording medium M serving as a verification object may be inputted with the operating unit 18 by the operator. In this case, the control unit 11 determines an attribute of the recording medium M serving as a verification object on the basis of the information denoting the attribute inputted with the operating unit 18 by the operator. Moreover, the control unit 11 may display a guidance inducing to input the information denoting an attribute of the recording medium M serving as a verification object on the display unit 17.

When a certificate type of the recording medium serving as a verification object is determined, the control unit 11 reads the imaging condition information denoting imaging conditions for verification and the layout information which are made to correspond to the certificate type, from the database 15a of the storage unit 15 (step 34).

When the imaging condition information is read, the control unit 11 sets conditions for imaging a picture of the recording medium serving as a verification object in accordance with the imaging condition information. Namely, in the control unit 11, by controlling the light source 12, the camera 13, and the condition modifying unit 14 in accordance with the imaging conditions for the certificate type, a picture to be imaged as the certificate type (a picture for verification) is imaged (steps S35).

For example, when an illumination route as an order of shifting an illuminating position and illuminating positions at which imaging has to be carried out are set as imaging conditions, the control unit 11 controls the condition modifying unit 14 to shift the light source 12 along the illumination route. Moreover, when an illuminating position of the light source 12 shifted along the illumination route reaches an illuminating position at which imaging has to be carried out, the control unit 11 images a picture of the recording medium M with the camera 13.

Further, when the layout information is read, the control unit 11 sets an area in which a picture to be verified is formed on the basis of the layout information. Here, suppose that the control unit 11 specifies the area of the picture to be verified by the picture processing unit 16. Further, suppose that the picture of the recording medium M imaged by the camera 13 is supplied to the picture processing unit 16. In accordance therewith, in the picture processing unit 16, an area of the picture to be verified is extracted from the picture of the recording medium M imaged by the camera 13 (step S36).

For example, with respect to the recording medium as shown in FIG. 11, the information denoting a position of the area g1 and the information denoting a position of the area g2 by the layout information are specified by the picture processing unit 16. In accordance therewith, in the picture processing unit 16, the pictures in the area g1 and the area g2 are extracted from the picture of the recording medium M imaged by the camera 13.

Further, the picture processing unit 16 stores the pictures in the respective areas extracted from the picture imaged by the camera 13 into the storage unit 15 so as to correspond to the information denoting the imaging conditions or the like (step S37). For example, when illuminating positions are set as imaging conditions, the pictures in the respective areas are stored into the storage unit 15 so as to correspond to the information denoting the illuminating positions.

Further, the control unit 11 judges whether or not the imaging of the pictures of the recording medium M serving as a verification object is completed in accordance with whether or not all the pictures to be imaged denoted by the imaging conditions of the certificate type have been imaged (step S38). When it is judged that imaging of the pictures of the recording medium M has not been completed by the judgment (step S38, NO), the control unit 11 repeatedly executes the processes at steps S35 to S38. For example, when it is set such that the pictures of the recording medium M illuminated from the illuminating positions A, B, and C are imaged under the imaging conditions, the control unit 11 repeatedly executes the processes at steps S35 to S38 until the imaging of the pictures of the recording medium M illuminated from the respective illuminating positions A, B, and C is completed.

When it is judged that the imaging of the pictures of the recording medium M has been completed by the judgment (step S38, YES), the control unit 11 reads the picture analysis information of the certificate type from the database 15a (step S39). When the picture analysis information of the certificate type has been read, the control unit 11 judges the contents of the picture analysis with respect to the pictures in the respective areas. When the contents of the picture analysis with respect to the pictures in the respective areas have been judged, the control unit 11 instructs the picture processing unit 16 to carry out the picture analysis with respect to the pictures in the respective areas. In accordance therewith, the picture processing unit 16 carries out the picture analysis with respect to the pictures in the respective areas on the basis of the picture analysis information of the certificate type (step S40).

For example, when difference pictures are set for a plurality of pictures in the area g1, the picture processing unit 16 carries out the process of generating difference pictures from the plurality of pictures in the area g1 stored in the storage unit 15 with the difference picture generating unit 16a.

Further, when vector analysis (analysis of a moving direction and a moving distance of a specific pattern) has been set with respect to the plurality of pictures in the area g1, the picture processing unit 16 carries out the process in which a moving direction and a moving distance of the specific picture are analyzed from the plurality of pictures in the area g1 stored in the storage unit 15 with the vector analyzing unit 16b, and a vector denoting the analysis result (i.e., information denoting a moving direction and a moving distance of the specific picture) is generated.

Further, when analysis of amounts of color differences in predetermined areas has been set with respect to a plurality of pictures in the area g2, the picture processing unit 16 carries out the process in which amounts of color differences denoting changes in colors in the respective predetermined areas are analyzed from the plurality of pictures in the area g2 stored in the storage unit 15 with the color difference analyzing unit 16c.

When the picture analysis based on the picture analysis information has been carried out, the control unit 11 reads the display condition information of the certificate type from the database 15a (step S41). When the display condition information of the certificate type has been read, the control unit 11 carries out the process of displaying a variety of information on the display unit 17 on the basis of the display condition information (step S42). For example, as conditions for displaying the pictures in the area g1 in the display condition information of the certificate type, when a difference picture and a vector are set as auxiliary information (analysis results) in addition to the pictures (dynamic image) in the area g1 imaged by the camera 13, the control unit 11 displays information as shown in FIG. 12 on the display unit 17. Further, as conditions for displaying the pictures in the area g2 in the display condition information of the certificate type, when amounts of color differences are set as auxiliary information (analysis results) in addition to the pictures (dynamic image) in the area g2 imaged by the camera 13, the control unit 11 displays information as shown in FIG. 13 on the display unit 17.

In accordance with the process as described above, in the verification apparatus 10, not only the pictures of the recording medium photographed under desired imaging conditions, but also auxiliary information for objectively judging the quality of those pictures are displayed on the display unit on the basis of the attribute information (setting information for verification) set for each certificate type.

In accordance therewith, it is possible for the operator to verify the quality (or the authenticity) of the recording medium (or the pictures formed on the recording medium), not only by recognizing the pictures with eyes, but also by recognizing the objective information (auxiliary information). As a result, in the verification apparatus 10, it is possible to carry out highly-precise verification for a short time.

Further, it is possible to carry out imaging process of pictures, analysis process for the pictures, and display process of the pictures on the basis of a variety of information made to correspond to a certificate type (an attribute) of the recording medium serving as a verification object. In accordance therewith, in the verification apparatus, it is possible to efficiently execute appropriate processes, which makes it possible to shorten a time required for verification process (display process for verifying the recording medium).

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An apparatus which determines verification conditions for verifying a recording medium on which a picture whose state changes in accordance with optical conditions is formed, the apparatus comprising:
    an illumination unit which illuminates the recording medium;
    an imaging unit which images a picture of the recording medium illuminated by the illumination unit;
    a changing unit which changes an optical relationship among the illumination unit, the imaging unit, and the recording medium;
    a display unit which displays a plurality of pictures of the recording medium imaged by the imaging unit in a state in which the optical relationship has been changed by the changing unit;
    a selection unit which enables a selection of at least one specific picture from among the plurality of pictures displayed on the display unit; and
    a storage unit which stores imaging conditions for imaging a picture for verification as verification conditions on the basis of an optical relationship at the time of photographing pictures which are selected by the selection unit.

2. The apparatus according to claim 1, further comprising a storage unit which stores information denoting the imaging conditions determined by the determination unit so as to correspond to identification information of the recording medium.

3. The apparatus according to claim 1, wherein the changing unit is a shifting mechanism which shifts at least one of positions of the illumination unit, the imaging unit, and the recording medium.

4. The apparatus according to claim 1, wherein the illumination unit has a plurality of light sources with different illumination conditions as an optical relationship among the illumination unit, the imaging unit, and the recording medium, and
    the changing unit selectively lights the respective light sources of the illumination unit.

5. The apparatus according to claim 1, further comprising a picture generating unit which generates a difference picture from said plurality of pictures imaged by the imaging unit,
    wherein the display unit displays the difference picture generated by the picture generating unit.

6. A method which determines verification conditions for verifying a recording medium on which a picture whose state changes in accordance with optical conditions is formed, the method comprising:
    illuminating the recording medium by an illumination unit;
    imaging a picture of the recording medium illuminated by the illumination unit with an imaging unit;
    changing an optical relationship among the illumination unit, the imaging unit, and the recording medium;
    displaying a plurality of pictures of the recording medium imaged by the imaging unit on a display unit in a state in which the optical relationship has been changed;
    selecting, by a selection unit, at least one specific picture from among the plurality of pictures displayed on the display unit; and
    determining imaging conditions for imaging a picture for verification as verification conditions on the basis of an optical relationship at the time of photographing pictures which are selected by the selection unit.

7. The method according to claim 6, further comprising storing information denoting the determined imaging conditions into a storage unit so as to correspond to identification information of the recording medium.

8. The method according to claim 6, wherein the changing shifts at least one of positions of the illumination unit, the imaging unit, and the recording medium.

9. The method according to claim 6, wherein the illumination unit has a plurality of light sources with different illumination conditions as an optical relationship among the illumination unit, the imaging unit, and the recording medium, and the changing selectively lights the respective light sources of the illumination unit.

10. The method according to claim 6, further comprising generating a difference picture from said plurality of pictures imaged by the imaging unit, wherein the displaying displays the generated difference picture on the display unit.

* * * * *